US007529719B2

(12) United States Patent
Liu et al.

(10) Patent No.: US 7,529,719 B2
(45) Date of Patent: May 5, 2009

(54) DOCUMENT CHARACTERIZATION USING A TENSOR SPACE MODEL

(75) Inventors: Ning Liu, Beijing (CN); Benyu Zhang, Beijing (CN); Jun Yan, Beijing (CN); Zheng Chen, Beijing (CN); Hua-Jun Zeng, Beijing (CN); Jian Wang, Beijing (CN)

(73) Assignee: Microsoft Corporation, Redmond, WA (US)

( * ) Notice: Subject to any disclaimer, the term of this patent is extended or adjusted under 35 U.S.C. 154(b) by 301 days.

(21) Appl. No.: 11/378,095

(22) Filed: Mar. 17, 2006

(65) Prior Publication Data

US 2007/0239643 A1 Oct. 11, 2007

(51) Int. Cl.
*G06N 5/00* (2006.01)
(52) U.S. Cl. .......................................... 706/29; 706/45
(58) Field of Classification Search .................... 706/29, 706/45
See application file for complete search history.

(56) References Cited

U.S. PATENT DOCUMENTS

| | | | | |
|---|---|---|---|---|
| 6,137,911 | A * | 10/2000 | Zhilyaev | 382/225 |
| 2004/0098385 | A1 * | 5/2004 | Mayfield et al. | 707/3 |
| 2005/0210036 | A1 * | 9/2005 | Vasilescu | 707/100 |
| 2007/0067281 | A1 * | 3/2007 | Matveeva et al. | 707/5 |

OTHER PUBLICATIONS

Cavnar et al. "NGram Based Text Categorization" In Proceedings of the Third Annual Symposium on Document Analysis and Information Retrival, Apr. 1994, 14 pages.*
Williams. "Statistics::Contingency—Calculate precision, recall, F1, accuracy, etc", CPAN. 2002, 5 pages.*
Cavnar, William B. et al. "NGram Based Text Categorization." In Proceedings of the Third Annual Symposium on Document Analysis and Information Retrieval, Apr. 1994, 14 pages.
De Lathauwer, Lieven et al., A Multilinear Singular Value Decomposition, SIAM Journal, 2000, p. 1253-1278, vol. 21, No. 4, Society for Industrial and Applied Mathematics, USA.

* cited by examiner

*Primary Examiner*—Wilbert L Starks, Jr.
(74) *Attorney, Agent, or Firm*—Perkins Coie LLP

(57) ABSTRACT

Computer-readable media having computer-executable instructions and apparatuses categorize documents or corpus of documents. A Tensor Space Model (TSM), which models the text by a higher-order tensor, represents a document or a corpus of documents. Supported by techniques of multilinear algebra, TSM provides a framework for analyzing the multi-factor structures. TSM is further supported by operations and presented tools, such as the High-Order Singular Value Decomposition (HOSVD) for a reduction of the dimensions of the higher-order tensor. The dimensionally reduced tensor is compared with tensors that represent possible categories. Consequently, a category is selected for the document or corpus of documents. Experimental results on the dataset for 20 Newsgroups suggest that TSM is advantageous to a Vector Space Model (VSM) for text classification.

15 Claims, 7 Drawing Sheets

DOCUMENT CHARACTERIZATION USING A TENSOR SPACE MODEL

BACKGROUND

Information retrieval (IR) techniques have attracted much attention during the past decades since people are frustrated by being drowned in huge amount of data while still being unable to obtain useful information. Vector Space Model (VSM) is the foundation of many information retrieval techniques, which is used to represent the text documents and define the similarity among them. Bag of Word (BOW) is the earliest approach used to represent document as a bag of words under the VSM. In the BOW representation, a document is encoded as a feature vector with each element in the vector indicating the presence or absence of a word in the document by Term Frequency and Inverted Document Frequency (TFIDF) indexing. However, the major limitation of BOW is that it only retains the frequency of the words in the document and loses the sequence information.

In the past decade, attempts have been made to incorporate the word-order knowledge with the vector space representation. N-gram statistical language model is a well-known one among them. The entries of the document vector by N-gram representation are strings of n consecutive words extracted from the collections. The entries are effective approximations. The entries not only contain the word-order information but also solve the language independent problem. However, the high-dimensional feature vectors of the entries make many powerful information retrieval technologies, e.g., Latent Semantic Indexing (LSI) and Principal Component Analysis (PCA), unfeasible for large dataset.

During the past few years, the IR researchers have proposed a variety of effective representation approaches for text documents based on VSM. Such a representation facilitates the classification of a document into an associated class. However, since the volume of available text data is increasing very fast, researchers often ask, "Are the further improvements likely to require a broad range of techniques in addition to the IR area?" Consequently, one may seek a new model for text documents representation based on new techniques.

Being able to classify documents in an effective and efficient manner is becoming more important with the increasing number of available documents on networked computer systems. A model for representing the content of a document would assist in classifying the document.

SUMMARY

A Tensor Space Model (TSM), which models the text by a higher-order tensor, represents a document or a corpus of documents. Supported by techniques of multilinear algebra, TSM provides a framework for analyzing the multifactor structures. TSM is further supported by operations and presented tools, such as the High-Order Singular Value Decomposition (HOSVD) for a reduction of the dimensions of the higher-order tensor. The dimensionally reduced tensor is compared with tensors that represent possible categories. Consequently, a category is selected for the document or corpus of documents. Experimental results on the dataset for 20 Newsgroups suggest that TSM is advantageous to a Vector Space Model (VSM) for text classification. The Tensor Space Model may also be applied to a dataset that contains non-language content. Embodiments support datasets characterizing deoxyribonucleic acid (DNA) sequences or music sequences.

This Summary is provided to introduce a selection of concepts in a simplified form that are further described below in the Detailed Description. This Summary is not intended to identify key features or essential features of the clamed subject matter, nor is it intended to be used as an aid in determining the scope of the claimed subject matter.

BRIEF DESCRIPTION OF DRAWINGS

The foregoing summary of the invention, as well as the following detailed description of preferred embodiments, is better understood when read in conjunction with the accompanying drawings, which are included by way of example, and not by way of limitation with regard to the claimed invention.

DETAILED DESCRIPTION

Aspects of the present invention relate to distinguishing the script type of at least one portion of a writing input.

The following is separated by subheadings for the benefit of the reader. The subheadings include: Terms, General-Purpose Computer, Tensor Space Model, HOSVD Algorithm, an Illustrative Example, and Experimental Results.

Terms

Order of Tensor: The order of tensor $\mathcal{A}$ is N if $\mathcal{A} \in R^{I_1 \times I_2 \times \cdots \times I_N}$, where R is a tensor space.

Dimension of Tensor: The dimension of tensor $\mathcal{A}$ is $D = I_1 + I_2 + \ldots + I_N$ if $\mathcal{A} \in R^{I_1 \times I_2 \times \cdots \times I_N}$, where R is a tensor space.

Higher-order Tensor: A tensor that has an order of at least three.

Core Tensor: A dimensionally-reduced tensor $\mathcal{Z}$ that is determined from HOSVD of tensor $\mathcal{D}$, where $\mathcal{Z} = \mathcal{D} \times_1 U_1^T \times_2 U_2^T \times \ldots \times_N U_N^T$.

General Purpose Computer

Figure 1:
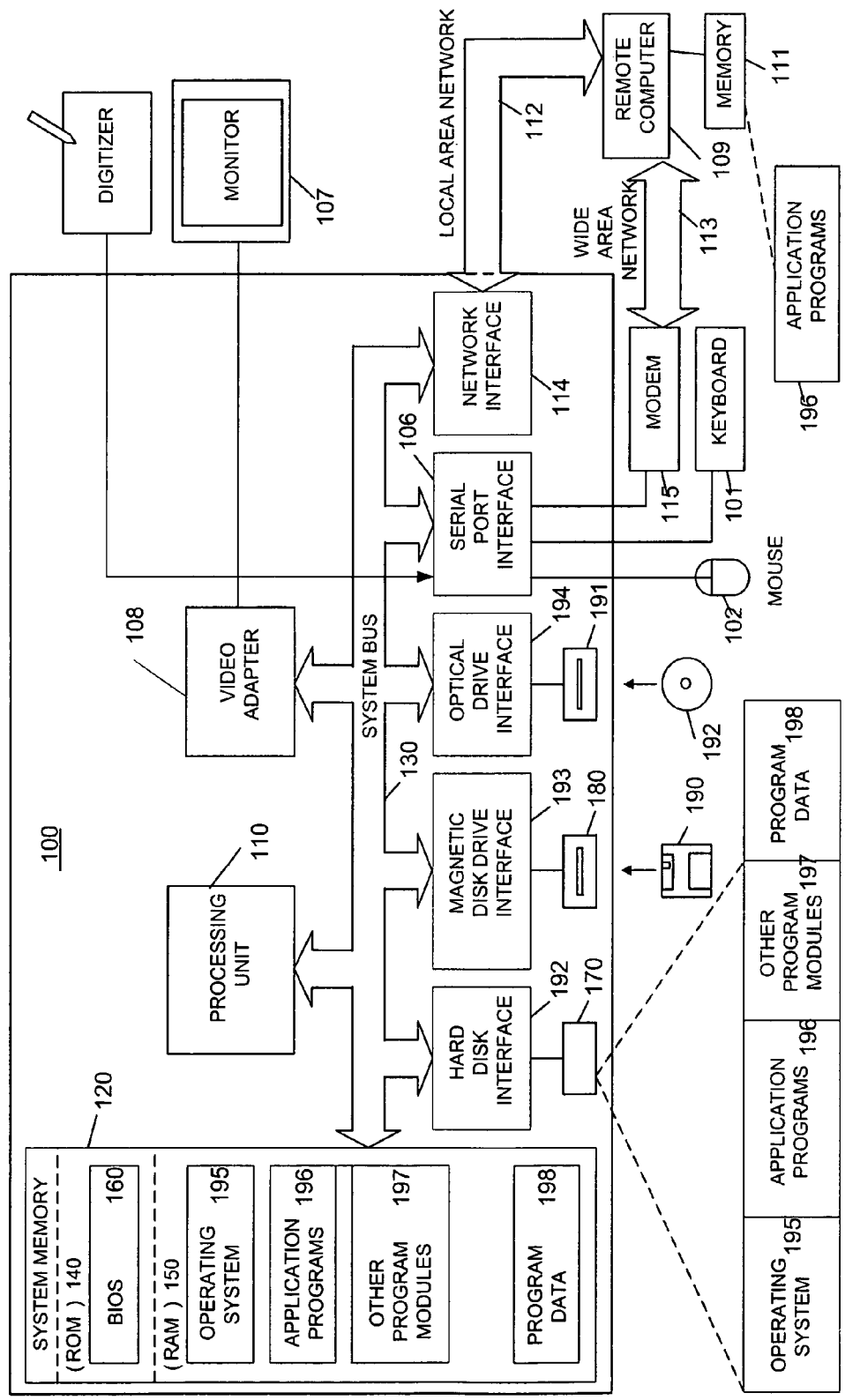
FIG. 1 is a functional block diagram of an example of a conventional general-purpose digital computing environment that can be used to implement various aspects of the present invention.

FIG. 1 is a functional block diagram of an example of a conventional general-purpose digital computing environment that can be used to process a writing input from a Pen (e.g., stylus 166). In FIG. 1, a computer 100 includes a processing unit 110, a system memory 120, and a system bus 130 that couples various system components including the system memory to the processing unit 110. The system bus 130 may be any of several types of bus structures including a memory bus or memory controller, a peripheral bus, and a local bus using any of a variety of bus architectures. The system memory 120 includes read only memory (ROM) 140 and random access memory (RAM) 150.

A basic input/output system 160 (BIOS), containing the basic routines that help to transfer information between elements within the computer 100, such as during start-up, is stored in the ROM 140. The computer 100 also includes a hard disk drive 170 for reading from and writing to a hard disk (not shown), a magnetic disk drive 180 for reading from or writing to a removable magnetic disk 190, and an optical disk drive 191 for reading from or writing to a removable optical disk 192 such as a CD ROM or other optical media. The hard disk drive 170, magnetic disk drive 180, and optical disk drive 191 are connected to the system bus 130 by a hard disk drive interface 192, a magnetic disk drive interface 193, and an optical disk drive interface 194, respectively. The drives and their associated computer-readable media provide nonvolatile storage of computer readable instructions, data structures, program modules and other data for the personal computer 100. It will be appreciated by those skilled in the art that other types of computer readable media that can store data that is accessible by a computer, such as magnetic cassettes, flash memory cards, digital video disks, Bernoulli cartridges, random access memories (RAMs), read only memories (ROMs), and the like, may also be used in the example operating environment.

A number of program modules can be stored on the hard disk drive 170, magnetic disk 190, optical disk 192, ROM 140 or RAM 150, including an operating system 195, one or more application programs 196, other program modules 197, and program data 198. A user can enter commands and information into the computer 100 through input devices such as a keyboard 101 and pointing device 102. Other input devices (not shown) may include a microphone, joystick, game pad, satellite dish, scanner or the like. These and other input devices are often connected to the processing unit 110 through a serial port interface 106 that is coupled to the system bus, but may be connected by other interfaces, such as a parallel port, game port or a universal serial bus (USB). Further still, these devices may be coupled directly to the system bus 130 via an appropriate interface (not shown). A monitor 107 or other type of display device is also connected to the system bus 130 via an interface, such as a video adapter 108. In addition to the monitor, personal computers typically include other peripheral output devices (not shown), such as speakers and printers.

The computer 100 can operate in a networked environment using logical connections to one or more remote computers, such as a remote computer 109. The remote computer 109 can be a server, a router, a network PC, a peer device or other common network node, and typically includes many or all of the elements described above relative to the computer 100, although only a memory storage device 111 has been illustrated in FIG. 1. The logical connections depicted in FIG. 1 include a local area network (LAN) 112 and a wide area network (WAN) 113. Such networking environments are commonplace in offices, enterprise-wide computer networks, intranets and the Internet.

When used in a LAN networking environment, the computer 100 is connected to the local network 112 through a network interface or adapter 114. When used in a WAN networking environment, the personal computer 100 typically includes a modem 115 or other means for establishing a communications over the wide area network 113, such as the Internet. The modem 115, which may be internal or external, is connected to the system bus 130 via the serial port interface 106. In a networked environment, program modules depicted relative to the personal computer 100, or portions thereof, may be stored in the remote memory storage device.

In an embodiment, as will be discussed in further detail, computer system 100 accesses a document from hard disk drive 170 or from a remote computer (e.g., remote computer 109 through the Internet). Computer system 100 processes text in the document to categorize the document into one of N classes. As will be discussed, computer system 100 represents the document with a tensor space model (TSM) to categorize the document. Computer system 100 may store the document into an associated directory for the selected category that is located in hard disk drive, include the classification information in a header of the document, or may send an indication of the classification to the remote computer.

With an embodiment, text in a document is represented using a tensor space model based on the algebraic character level high-order tensors (the natural generalization of matrices) and offers a mathematical framework for analyzing the multifactor structure. In contrast to VSM, TSM represents a text document by high-order tensors (i.e., having an order of 3 or greater) instead of vectors (1-order tensors) and matrices (2-order tensors). The features of each coordinate are letter (symbol) "a" to "z" and all the other analphabetic symbols such as interpunctions are denoted by "_". Moreover a dimensionality reduction algorithm is used based on a tensor extension of the conventional matrix Singular Value Decomposition (SVD), known as the High-Order SVD (HOSVD). The HOSVD technique can find some underlying and latent structure of documents and enable algorithms such as LSI and PCA to be implemented with TSM. Moreover, the theoretical analysis and experiments suggest that HOSVD under TSM can find some underlying and latent structure of documents and can significantly outperform VSM on the problems of classification with small training data.

Another attribute of TSM is that it may utilize many multilinear algebra techniques to increase the performance of information retrieval (IR).

Tensor Space Model (TSM)

Figure 2:
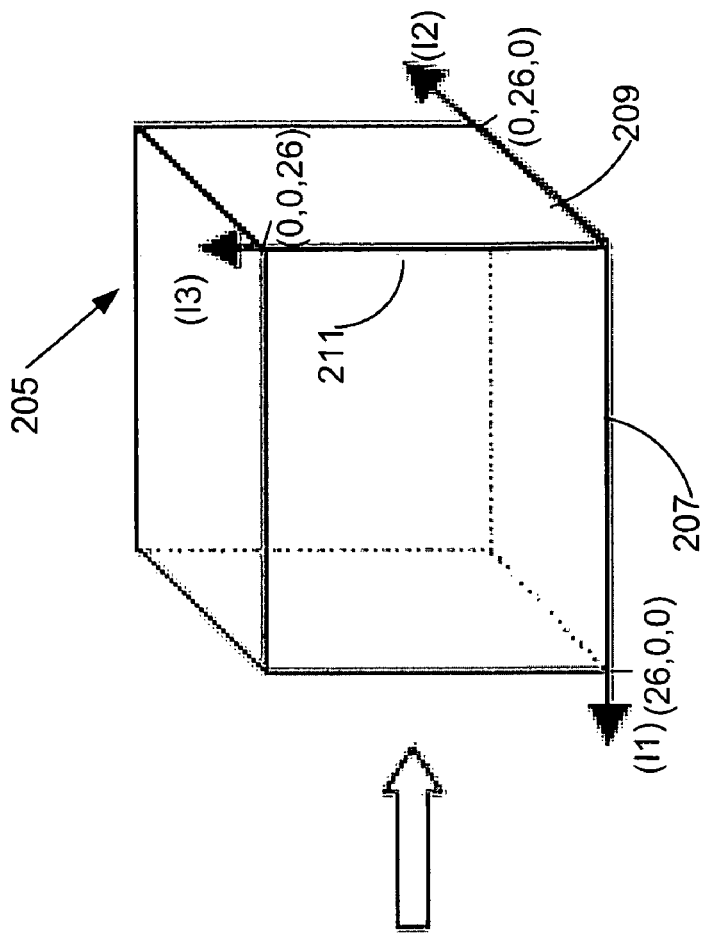
FIG. 2 shows a document that is represented as a character 3-order tensor in accordance with an illustrative aspect of the present invention.
Figure 2:
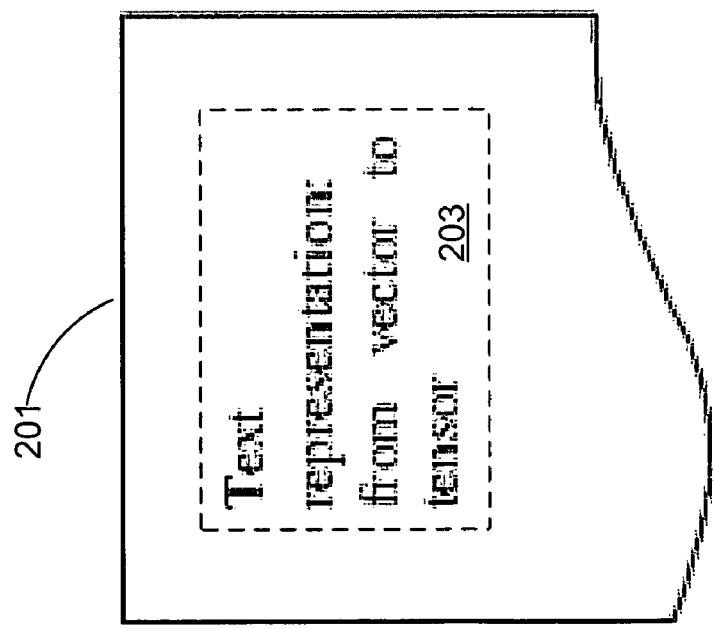

"Tensor" is a term in multilinear algebra. It is a generalization of the concepts of "vectors" and "matrices" in the area of linear algebra. Intuitively, a vector data structure is called 1-order tensor and a matrix data structure is called a 2-order tensor. Then a cube-like data structure is called a 3-order tensor (e.g., corresponding to tensor space 205 as shown in FIG. 2) and so on. In other words, the higher order tensors are abstract data structures that are generalization of vectors and matrices. TSM makes use of the tensor structure to describe the text documents and makes use of the techniques of multilinear algebra to increase the performance of IR.

The following introduces notations that are used in the subsequent discussion. Scalars are denoted by lower case letters (e.g., a, b, . . . ), vectors are denoted by normal font capital letters (e.g., A, B, . . . ), matrices by bold capital letters (e.g., A, B, . . . ), and the higher-order tensors are denoted by curlicue capital letters ($\mathcal{A}, \mathcal{B}, \ldots$). One can define the order of a tensor as N where $$\mathcal{A} \in \mathbb{R}^{I_1 \times I_2 \times \ldots \times I_N} \qquad (EQ. 1)$$

The entries (elements) of $\mathcal{A}$ are denoted by $$a_{i_1 \ldots i_n \ldots i_N} \qquad (EQ. 2)$$

where $1 \leq i_n \leq I_n$ for $1 \leq n \leq N$.

The traditional BOW cannot catch and utilize the valuable word order information. On the contrary, although the N-gram representation of documents may imply word sequence information, the generated high dimensional vectors may require high storage and computational complexity. The high complexity may cause powerful tools such as LSI and PCA to fail in the text mining and information retrieval process. Higher order tensors are used to represent the text documents so that both the word order information and the complexity problem are considered. Moreover, TSM may also provide other advantages compared with the popular used BOW and N-gram models. In an embodiment, TSM is a model used for text document representation.

FIG. 2 shows a document that is represented as a character 3-order tensor (corresponding to tensor space 205) in accordance with an illustrative aspect of the present invention. The example, as shown in FIG. 2, depicts document 201, which consists of text block 203 having eleven words: "Text representation: from vector to tensor". The example uses a 3-order tensor $\mathcal{A} \in R^{I_1 \times I_2 \times I_3}$ to represent document 201 and to index document 201 with the 26 English letters. (Other embodiments, support text in other languages, e.g., Chinese, Arabic, Russian, and Hindi.) All the other characters except the 26 characters such as interpunctions and spaces are treated as the same and denoted by "_". The character string in this document may be separated by characters as: "tex, ext, xt_, t_r, _re, rep, . . . " The 26 letters "a" to "z" and "_" span each axis (coordinate) of the tensor space 205. Document 201 may be represented by a 27×27×27 tensor. The "_" character corresponds to zero of each axis (axis 207, 209, or 211), "a" to "z" correspond to 1 to 26 of each axis. For example, the corresponding position of "tex" is (20, 5, 24) since "t" is the 20th character among all the 26 English letters, "e" is the 5th and "x" is the 24th. In the example, the text string "xt_" corresponds to (24, 20, and 0). One may use the TFIDF method to weight each position (entry) of the tensor in the same way for VSM.

TF denotes the number of times a term (character string) appears in the document. IDF denotes the number of documents that contain this term. For example, suppose one is processing two documents, where the first document contains "abcabc" and the second document contains "abc". For the first document, the character string "abc" appears twice; consequently the TF is 2. For the second document, the TF equals 1. Because the character string "abc" appears in both documents, the IDF equals 2.

While the above example processes a three character string, embodiments may support different string lengths in order to achieve a desired level of performance. For example, if J character strings are supported, then the corresponding tensor has an order of J.

Figure 3:
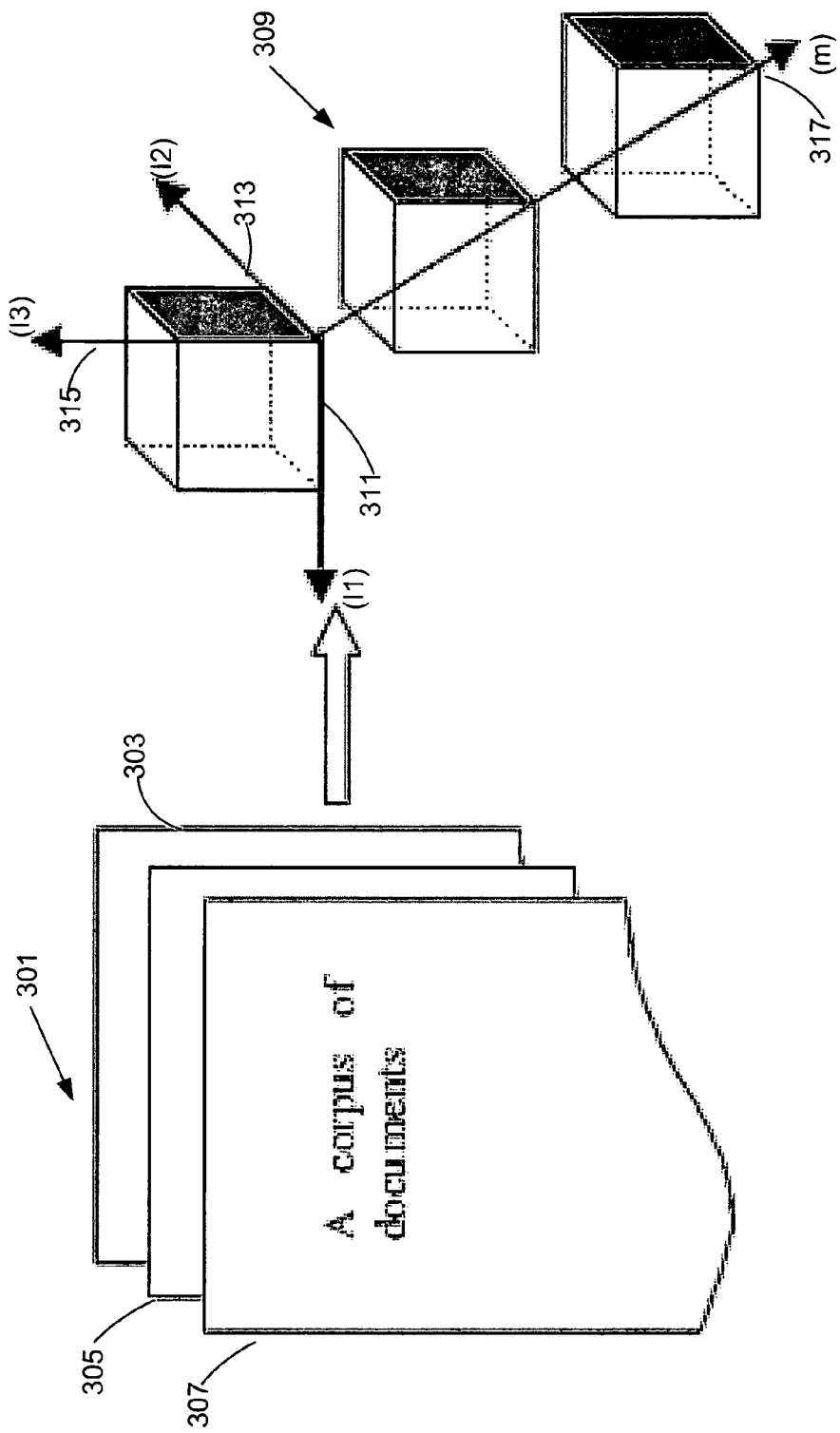
FIG. 3 shows a corpus of documents that is represented as a 4-order tensor in accordance with an illustrative aspect of the present invention.

The above approach may be applied to a collection (corpus) of documents. FIG. 3 shows a corpus of documents 301 that is represented as a 4-order tensor in accordance with an illustrative aspect of the present invention. Each document (303, 305, and 307) of corpus 301 is represented by a character level 3-order tensor in vector space 309. When assembling the corpus (collection) 301, the corresponding tensor is a 4-order tensor in a 27·27·27·m tensor space (corresponding to coordinates 311, 313, 315, and 317), where m is the number of documents, as illustrated in FIG. 3. However, with the TSM model the order of the tensor for each document is not limited to 3; thus, the order of a tensor for a corpus of documents is not limited to 4. Without loss of generality, a corpus with m documents may be represented as a character level tensor:

$$A = \{a_{i_1 i_2 i_3}\} \in R^{I_1 \times I_2 \times I_3 \times \cdots \times I_{N-1} \times m} \qquad (EQ.\ 3)$$

where each document is represented by an (N−1)-order tensor.

HOSVD Algorithm

Figure 4:
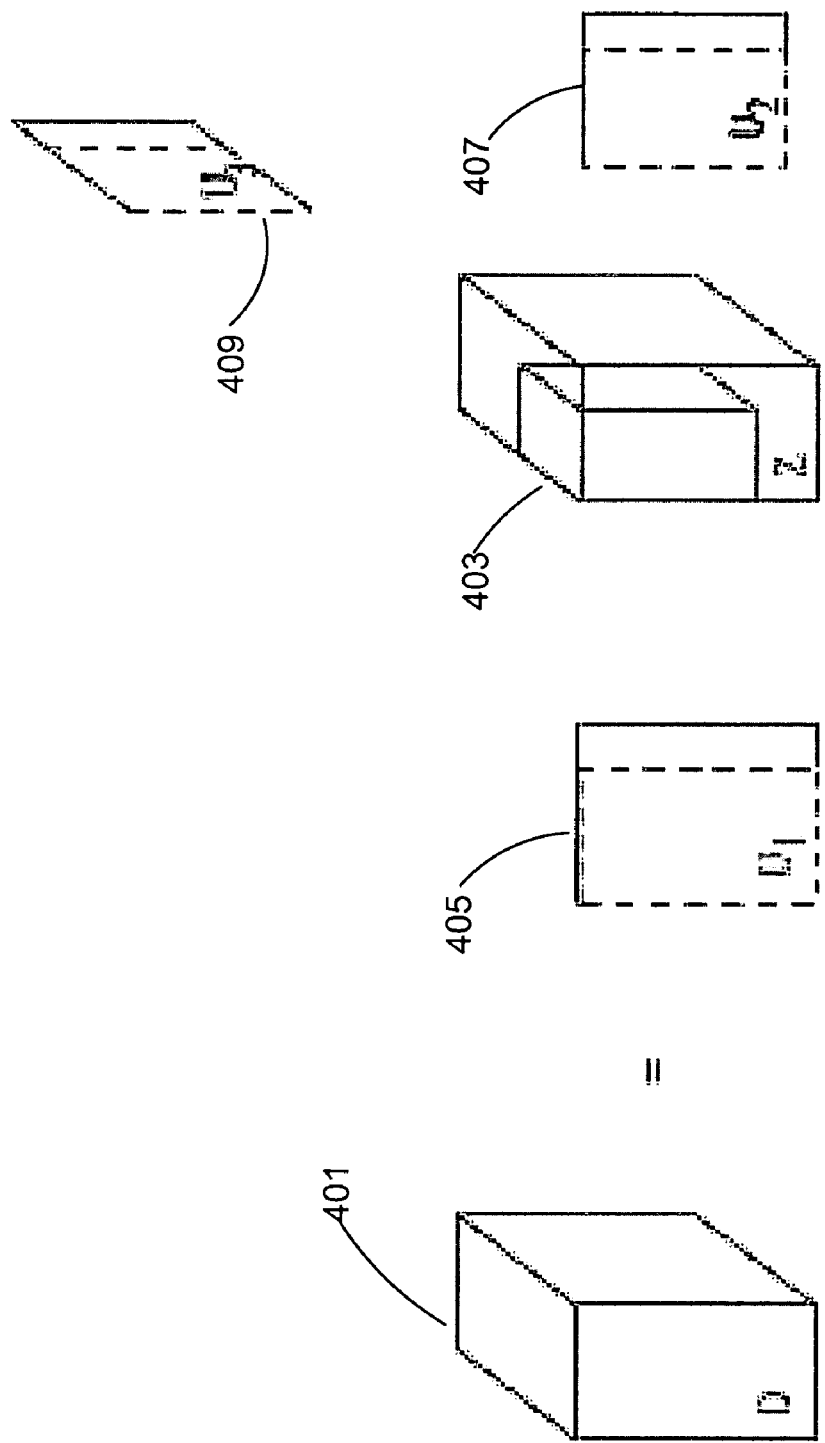
FIG. 4 illustrates a higher-order singular decomposition of a tensor in accordance with an illustrative aspect of the present invention.

VSM represents a group of objects as a "term by object matrix" and uses SVD technique to decompose the matrix as $$D = U_1 \Sigma U_2^T \qquad (EQ.\ 4)$$

which is a technique used for Principal Component Analysis (PCA) and Latent Semantic Indexing (LSI) algorithms. Similarly, a tensor $\mathcal{D}$ in TSM undergoes Higher-Order SVD, which is an extension of matrix SVD. FIG. 4 illustrates a higher-order singular decomposition of a tensor 401 (having an order of 3) in accordance with an illustrative aspect of the present invention. Tensor $\mathcal{D}$401 is decomposed into core tensor $\mathcal{Z}$403, which has a smaller dimension than tensor $\mathcal{D}$401. Matrices $U_1$ 405, $U_2$ 407, and $U_3$ 409 operated on core tensor $\mathcal{Z}$403 to reconstruct tensor $\mathcal{D}$401. (Core tensor $\mathcal{Z}$ may be referred as a dimensionally reduced tensor.)

The HOSVD algorithm based on TSM is described as follows:

Step 1: Represent a group of documents as a character level tensor $$D = \{d_{i_1 i_2 i_3 \cdots i_{N+1}}\} \in R^{27 \times 27 \times \cdots \times 27 \times m} \qquad (EQ.\ 5)$$

where m is the number of documents.

Step 2: For n=1 . . . N, compute the matrix $U_n$ by performing the SVD of the flattened matrix D(n) where $U_n$ is the left matrix in the SVD result.

Step 3: Solve the core tensor as follows:
$$\mathcal{Z} = \mathcal{D} \times_1 U_1^T \times_2 U_2^T \times \ldots \times_N U_N^T \qquad (EQ.\ 6)$$

where matrix $U_n$ contains the orthogonal vectors spanning the column space of the matrix D(n). (The index in front of a matrix $_i U_i^T$ means $U_i^T$ is calculated based on the $D_{(i)}$ and $\mathcal{D} \times_1 U_1^T \times_2 U_2^T = (\mathcal{D}_{(1)} \times U_1^T)_{(2)} \times U_2^T) D_{(n)}$ is the matrix unfolding of the tensor, which is the matrix representation of the tensor in which all the column vectors are ranked sequentially.

As will be discussed, characteristics of the core tensor $\mathcal{Z}$403 is compared to tensors that are associated with different categories. In an embodiment, one may process the core tensor in order to determine the category of the associated document.

1) Train the SVM classifier by LIBSVM under the training core tensor (e.g., the training core tensor available from the Department of Computer Science and Information Engineering at National Taiwan University)
2) Transform all the testing data to the transformed lower dimensional space by projection matrix
3) Evaluate the classification performance by Micro F1 on the lower-dimensional testing data (Micro F1 will be discussed.)

Example of Determining Core Tensor of the HOSVD

The following example has been simplified to facilitate explanation, where each character is selected from a set of three characters rather than twenty seven characters. Consider the (3×3×3) tensor $\mathcal{A}$ defined by an unfolded matrix $A_{(1)}$ equal to:

$$\begin{pmatrix} 0.9073 & 0.7158 & -0.3698 & 1.7842 & 1.6970 & 0.0151 & 2.1236 & -0.0740 & 1.4429 \\ 0.8924 & -04898 & 2.4288 & 1.7753 & -1.5077 & 4.0337 & -0.6631 & 1.9103 & -1.7495 \\ 2.1488 & 0.3054 & 2.3753 & 4.2495 & 0.3207 & 4.7146 & 1.8260 & 2.1335 & -0.2716 \end{pmatrix}$$

The 1-mode singular vectors are the columns of the left singular matrix of $A_{(1)}$:

$$U^{(1)} = \begin{pmatrix} 0.1121 & -0.7739 & -0.6233 \\ 0.5771 & 0.5613 & -0.5932 \\ 0.8090 & -0.2932 & 0.5095 \end{pmatrix}$$

Using the same approach, $U^{(2)}$ and $U^{(3)}$ can be obtained:

$$U^{(2)} = \begin{pmatrix} 0.4624 & 0.0102 & 0.8866 \\ 0.8866 & -0.0135 & -0.4623 \\ -0.0072 & -0.9999 & 0.0152 \end{pmatrix}$$

$$U^{(3)} = \begin{pmatrix} 0.6208 & -0.4986 & 0.6050 \\ -0.0575 & -0.7986 & -0.5992 \\ 0.7819 & 0.3371 & -0.5244 \end{pmatrix}$$

The core tensor of the HOSVD then follows from application of EQ. 6 (where $S = \mathcal{A} \times_1 U_1^T \times_2 U_2^T \times_3 U_3^T$). The unfolding $S(1)$ matrix is equal to:

$$\begin{pmatrix} 8.7088 & 0.0489 & -0.2797 & 0.1066 & 3.2737 & 0.3223 & -0.0033 & -0.1797 & -0.2222 \\ -0.0256 & 3.2546 & -0.2853 & 3.1965 & -0.2130 & 0.7829 & 0.2948 & -0.0378 & -0.3704 \\ 0.0000 & 0.0000 & 0.0000 & 0.0000 & 0.0000 & 0.0000 & 0.0000 & 0.0000 & 0.0000 \end{pmatrix}$$

The core tensor is all-orthogonal: the rows of $S_{(1)}$ are mutually orthogonal, but so also are the matrices formed by columns 1/2/3, 4/5/6, and 7/8/9, as well as the three matrices formed by columns 1/4/7, 2/5/8, and 3/6/9. Consequently, the "horizontal," "frontal," and "vertical" matrices of $\mathcal{A}$ are orthogonal. The core tensor $\mathcal{A}$ is also ordered: its matrices are put in order of decreasing Frobenius-norm. The Frobenius-norms give the n-mode singular values of $\mathcal{A}$:

mode 1: 9.3187, 4.6664, 0, mode 2: 9.3058, 4.6592, 0.5543, mode 3: 9.2822, 4.6250, 1.0310

Illustrative Example

Tensor Space Model

Consider the simple document below which consists of eleven words: "Text representation: from vector to tensor" (for example as shown as text block 203 as shown in FIG. 2). In the illustrative example, one uses a 3-order tensor $\mathcal{A} = \{a_{i_1 i_2 i_3}\} \in R^{I_1 \times I_2 \times I_3}$ to represent this document and index this document by the 26 English letters. All the other characters except the 26 characters such as interpunctions and spaces are treated as the same and denoted by "_". The character string in this document may be separated by characters as: "tex, ext, xt_, t_r, _re, rep, . . . ".

The 26 English letters "a" to "z" and "_" span each axis of the tensor space. Then the document is represented by a 27×27×27 tensor. The "_" character corresponds to zero of each axis, "a" to "z" correspond to 1 to 26 of each axis. For example, the corresponding position of "tex" is (20, 5, 24) since "t" is the $20^{th}$ character among all the 26 English characters, "e" is the $5^{th}$ and "x" is the $24^{th}$. Another example, "xt_" corresponds to (24, 20, 0).

If one organizes a corpus of documents together, it is a 4-order tensor in a tensor 27×27×27×m space, where m is the number of documents. Without loss of generality, a corpus with m documents may be represented as a character level tensor $\mathcal{A} = \{a_{i_1 i_2 i_3 \ldots i_N}\} \in R^{27 \times 27 \times \ldots \times 27 \times m}$ where each document is represented by an (N−1)-order tensor.

HOSVD Algorithm

HOSVD is the technique for dimensional reduction. If m documents be represented as a character level tensor $$A = [a_{i_1 i_2 i_3 \ldots i_N}] \in R^{27 \times 27 \times \ldots \times 27 \times m},$$

one calculates a lower-dimension tensor $$\hat{A} = \{a_{i_1 i_2 i_3 \ldots i_N}\} \in R^{d_1 \times d_2 \times d_3 \cdots m}$$

to approach $\mathcal{A}$ (where $d_j \leq 27$, j=1, 2, . . . N−1). As a simple example, one only reduces the first coordinate of the original tensor. One uses a 4-order 27×27×27×m tensor to represent a corpus of documents. The objective of this example is to calculate a new lower-dimension 4-order $d_1 \times 27 \times 27 \times m$ tensor to replace the original tensor ($d_1 \leq 27$). Note in typical applications, one typically reduces the dimension of the original tensor along all coordinates (axes).

Step 1: Matrix Unfolding

Unfold the original tensor for the first coordinate and determine a matrix $D_{(1)} \in R^{27 \times (27 \times 27 \times m)}$.

Assume an N-order tensor $\mathcal{D} \in R^{I_1 \times I_2 \times \ldots \times I_N}$.

The matrix unfolding $D_{(n)} \in R^{I_n \times (I_{n+1} I_{n+2} \cdots I_N I_1 \cdots I_{n-1})}$ contains the element $d_{i_1 \ldots i_n \ldots i_N}$ at the position with the row $i_n$ and the column number equal to:

$$(i_{n+1} - 1)I_{n+2}I_{n+3} \ldots I_N I_1 \ldots I_{n-1} + (i_{n+2} - 1)I_{n+3}I_{n+4} \ldots I_N I_1 \ldots I_{n-1} +$$
$$\ldots + (i_N - 1)I_{n+3}I_{n+4} \ldots I_N I_1 \ldots I_{n-1} +$$
$$(i_{n+2} - 1)I_{n+3}I_{n+4} \ldots I_N I_1 \ldots I_{n-1} + (i_N - 1)I_1 \ldots I_{n-1} +$$
$$(i_1 - 1)I_2 \ldots I_{n-1} + (i_2 - 1)I_3 \ldots I_{n-1} + \ldots + i_{n-1}$$

Step 2: Matrix SVD

Use SVD technique to decompose the matrix as $$D_{(1)} = U_{(1)} \Sigma V_{(1)}^T$$

Based on the mathematical theory, one may use the first $d_1$ eigenvector of $U_{(1)}$, denoted as $\hat{U}_{(1)} \in R^{d_1 \times 27}$, to calculate a lower-dimension matrix to approximate $D_{(1)}$ by $\hat{D}_{(1)} = \hat{U}_{(1)} \times D_{(1)} \in R^{d_1 \times (27 \times 27 \times m)}$ Step 3: Matrix Folding Fold the new matrix $\hat{D}_{(1)}$ is an inverse procedure of the unfolding. One determines a new lower-dimension tensor $\hat{A} \in R^{d_1 \times 27 \times 27 \times m}$ which is an approximation of the original tensor.

If one wants to calculate the tensors $$\hat{A} = \{a_{i_1 i_2 i_3 \ldots i_N}\} \in R^{d_1 \times d_2 \times d_3 \cdots m},$$

then one repeats steps 1, 2, and 3 at the different coordinate.

Apparatus

Figure 5:
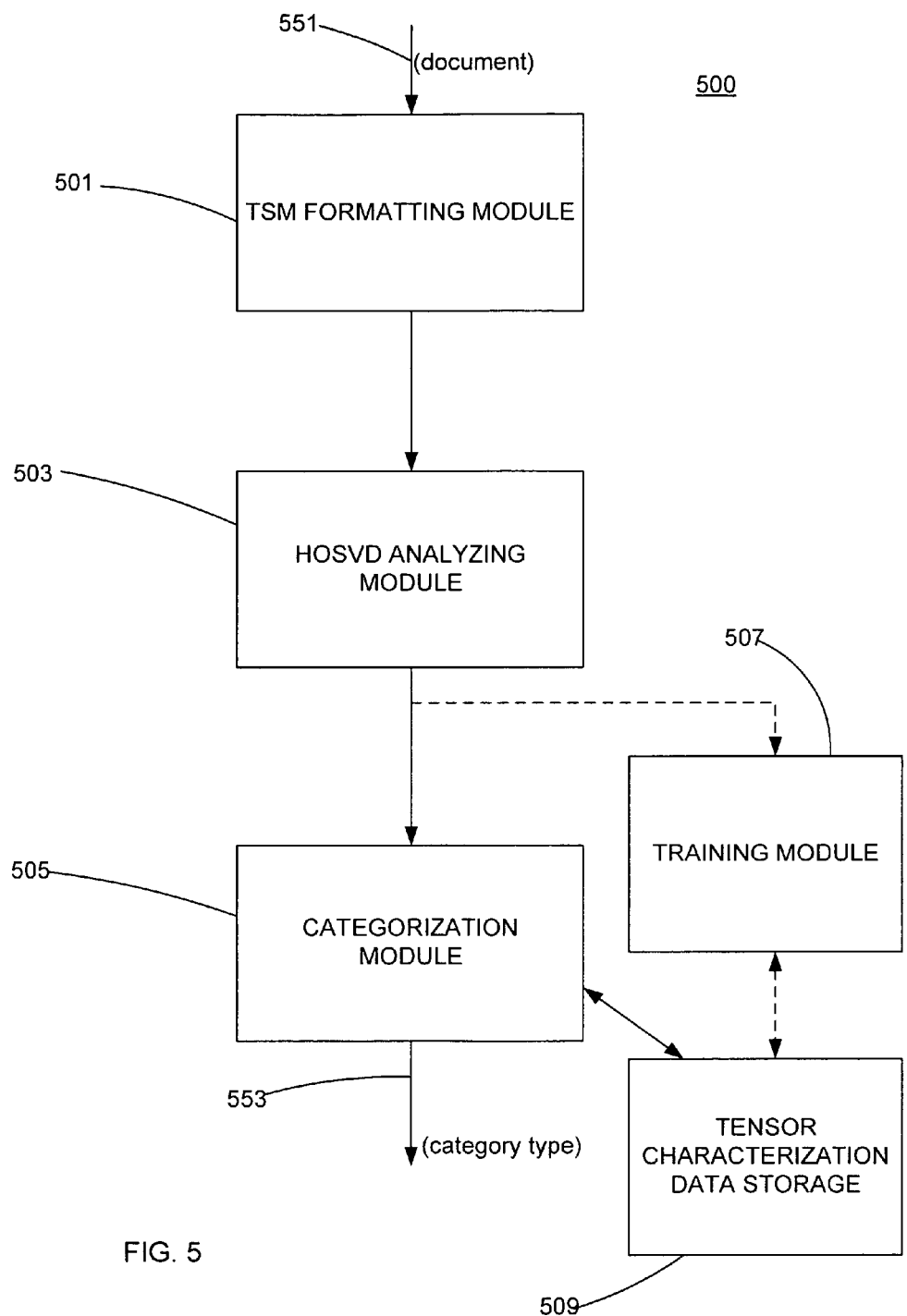
FIG. 5 shows apparatus for processing a document with a vector space model in accordance with an illustrative aspect of the present invention.

FIG. 5 shows apparatus 500 for processing document 551 with a vector space model in accordance with an illustrative aspect of the present invention. Apparatus includes TSM formatting module 501, HOSVD analyzing module 503, and categorization module 505 in order to determine category type 553 of document 551.

In an embodiment, TSM formatting module 501 processes text in document 551 in order to form the entries in a tensor $\mathcal{D}$ representing document 551. As previously discussed, a point in tensor space having J coordinates is determined for each entry in the tensor $\mathcal{D}$, where an entry corresponds to a string length of J characters. However, as the string length increases, the dimensionality of the tensor geometrically grows in size.

HOSVD analyzing module 503 decomposes the tensor that represents document 551 in accordance with EQ. 6. Consequently, HOSVD analyzing module 503 determines a reduced tensor (core tensor $\mathcal{Z}$), which has a reduced dimensionality with respect to tensor $\mathcal{D}$ as previously discussed.

With an embodiment, associated reduced tensors are created for each of the text categories during a training session. In the training process, a plurality of documents is provided to apparatus 500 for each text category. For each document, TSM formatting module 501 forms a higher-order tensor and HOSVD analyzing module 503 reduces the higher-order tensor to a dimensionally reduced tensor $\mathcal{Z}$ in accordance with EQ. 6.

When the plurality of documents are processed for the text category during the training process, the corresponding dimensionally reduced tensors for the text category may be averaged to obtain the associated reduced tensor for the text category. The associated reduced tensor for the text category is stored in tensor characterization data storage 509. The above process is repeated for the other text categories.

Categorization module 505 compares core tensor $\mathcal{Z}$ with tensors that are associated with different categories and selects the category that is associated with the tensor being the most similar with core tensor $\mathcal{Z}$. Categorization module 505 accesses an associated reduced tensor that characterizes an associated category (e.g., a specific newsgroup). Categorization module 505 obtains the associated reduced tensors by accessing tensor characterization data storage 509. Category type 553 is equated to the selected category.

Experimental Results

Conducted experiments compare the proposed TSM with VSM on 20 Newsgroups Dataset, which has become a popular data set for experiments in text applications of machine learning techniques. In the conducted experiments, five classes of 20 Newsgroups collection about computer science have been selected that are very closely related to each other.

The widely used performance measurements for text categorization problems are Precision, Recall and Micro F1. Precision is a ratio, which could be computed by the number of right categorized data over the number of all testing data. Recall is a ratio, which could be computed by the number of right categorized data over the number of all the assigned data. Micro F1 is a common measure in text categorization that combines recall and precision. In this paper, we use the Micro F1 measure, which combines recall and precision into a single score according to the following formula:

$$\text{Micro } F1 = (2P \cdot R)/(P+R) \quad \text{(EQ. 7)}$$

where P is the Precision and R is the Recall.

Figure 6:
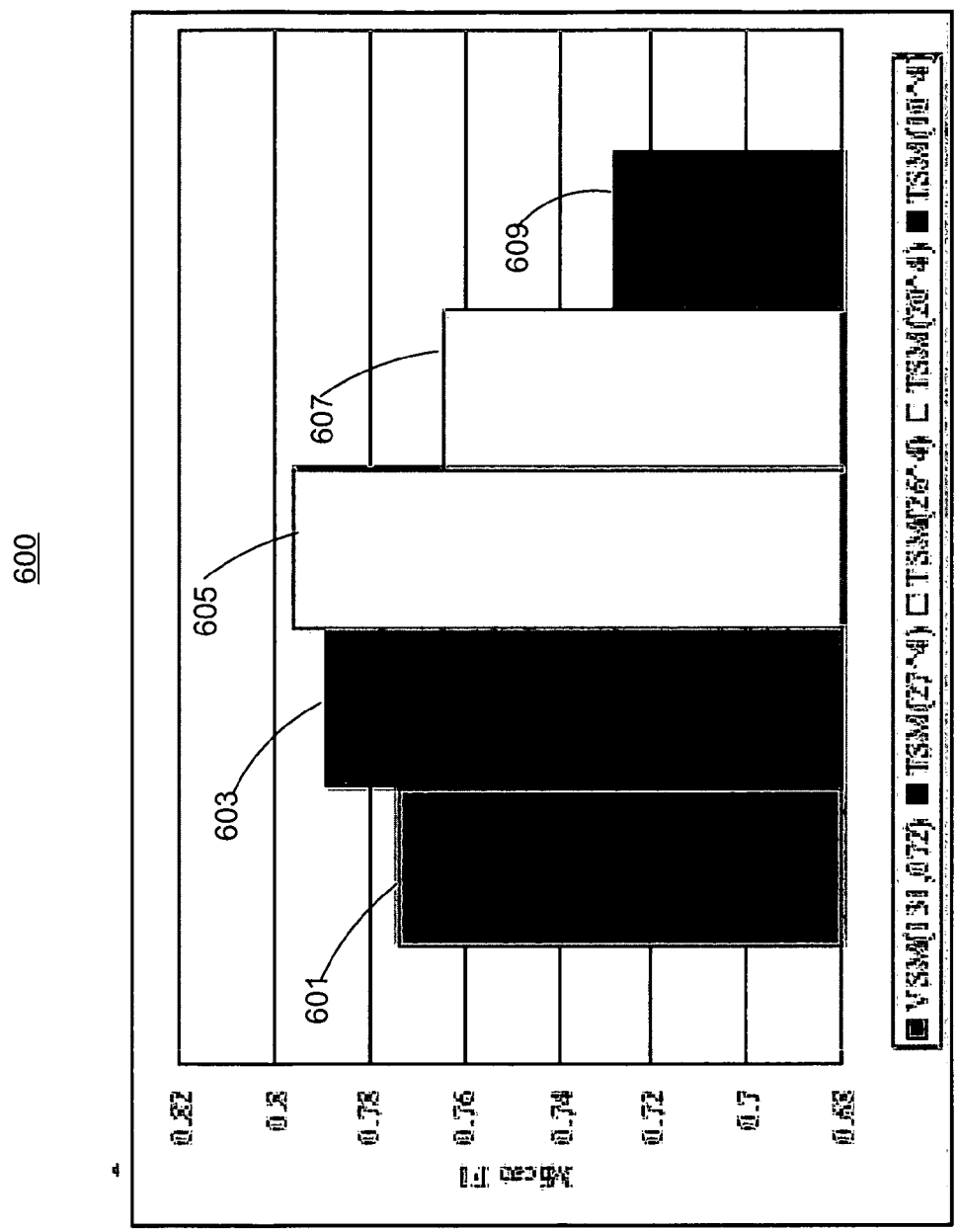
FIG. 6 shows experimental results of a vector space model (VSM) and a tensor space model (TSM) in accordance with an illustrative aspect of the present invention.

Each text document of this dataset is mapped into a 131,072-dimension vector under VSM. We use a 4-order tensor to represent each document under TSM. The original dimension of each tensor is $27^4 = 531,441$. (In FIGS. 6 and 7, $x\hat{\ }y$ denotes $x^y$). One uses the HOSVD technique to reduce the dimension of the tensor to different dimensions ($26^4$, $20^4$ and $10^4$). FIG. 6 shows experimental results 600 of a vector space model (VSM) and a tensor space model (TSM) in accordance with an illustrative aspect of the present invention. In FIG. 6, one may compare the results of VSM in contrast to TSM in different reduced dimensions.

It can be seen that the result 603 of 4-order tensor with the original dimension ($27^4$) is better than the result 601 of VSM with dimension 131,072. Moreover, the result 605 of 4-order tensor whose dimension is reduced to $26^4$ by HOSVD is better than results 607 and 609 corresponding to TSM with $20^4$ dimensions and TSM with $10^4$ dimensions. This suggests that HOSVD may find the principal component and remove the noise. However, though the performance 609 of $10^4$-dimension reduced tensor is much lower than VSM and original 4-order TSM, the result is acceptable and the low dimensional representation may cause the computation to be more efficient.

Figure 7:
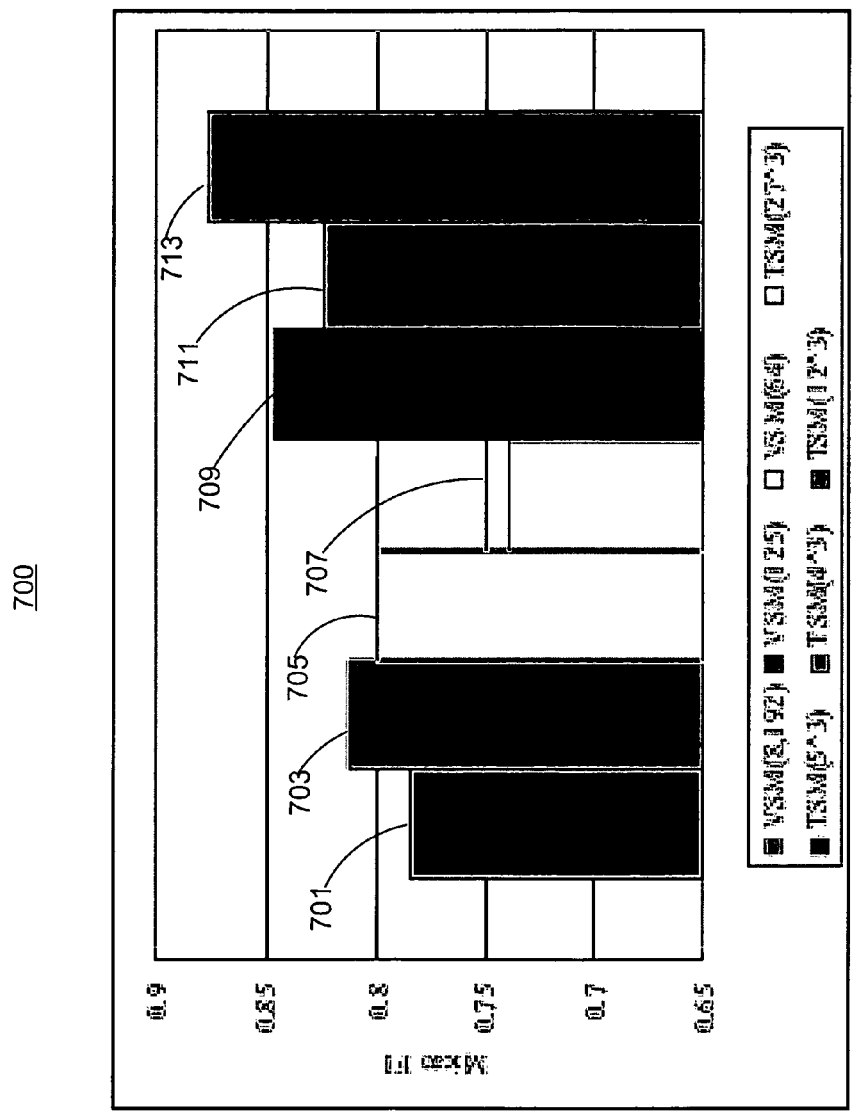
FIG. 7 shows experimental results of a vector space model (VSM) and a tensor space model (TSM) in accordance with an illustrative aspect of the present invention.

One typically does not reduce the dimension of 20 Newsgroups data by SVD under VSM since there are a very large number of terms for a document matrix with 20 newsgroups to be decomposed, resulting in large amount of time to compute with corresponding space complexity. To compare the VSM by SVD with TSM by HOSVD, one may randomly sample a subset of the 20 newsgroups with the ratio of about 5% such that the data dimension is about 8,000 under VSM re-indexing. The subset contains 230 documents in two classes: 165 for training and 65 for testing. By doing so, one can perform the matrix SVD on this sampled data. FIG. 7 shows experimental results 700 of a vector space model (VSM) and a tensor space model (TSM) in accordance with an illustrative aspect of the present invention.

It can be seen that if can reduce the data with VSM and the data with TSM to the same dimension (e.g., 125 versus $5^3$ corresponding to result 703 versus result 709, 64 versus $4^3$ corresponding to result 705 versus 711), the reduced TSM data appears to outperform its counterpart. Moreover, the dimension of reduced data under VSM cannot larger than 165 since the number of documents (smaller than the term dimension) determines the rank of this "term by document matrix", and the rank of this matrix determines there are at most 165 singular vectors. On the contrary, the HOSVD under TSM can reduce the data to any dimension and is not limited by the number of samples. FIG. 7 suggests that the 12·12·12 reduced tensors can achieve outstanding performance than all the others while the SVD under VSM cannot reduce data to such a dimension. (Data typically contains some noise. In the experimental example, TSM (27^3) considers the relationship of three-connective letters in the presence of noise. Dimension reduction may reduce the noise and consequently improve the performance.)

As previously discussed, a tensor space model is used to represent text documents. By using TSM and HOSVD, an underlying and latent structure of documents may be found. Theoretical analysis and experimental results suggest that the TSM keeps the advantages of VSM and improves upon some of the disadvantages of VSM for certain IR problems.

In addition to categorizing documents with text, as discussed above, embodiment support the categorization of documents with non-language content (datasets) as well as documents with a combination of text and no-language content. A document may contain non-language content having a collection of symbols representing conceptual entities and associated relations among the entities. As examples, one may apply a tensor state model (TSM) to deoxyribonucleic acid (DNA) sequences or to music sequences. One may model features (characteristics) of DNA or music rather than the letters of text. For example, a song may be converted into a sequence of pitch, corresponding to the feature of each coordinate of the tensor. As another example, a nucleotide sequence contains a combination of condons, where each codon corresponds to an adjacent group of three nucleotides. One then calculates length-n subsections. The symbols may be mapped to points in a tensor space using a similar approach as shown in FIG. 2.

As can be appreciated by one skilled in the art, a computer system with an associated computer-readable medium containing instructions for controlling the computer system can be utilized to implement the exemplary embodiments that are disclosed herein. The computer system may include at least one computer such as a microprocessor, digital signal processor, and associated peripheral electronic circuitry.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. A computer-readable medium having computer-executable instructions for controlling a processor of a computer system to categorize a document by a method comprising:

for each of a plurality of categories, providing documents within that category, each document having words with characters;

for each document, generating a high-order tensor having an order of at least three, each order represented by a coordinate with characters as dimensions of the coordinate, each element of the high-order tensor representing a sequence of at least three characters and being set to a weight based on number of occurrences of that sequence of at least three characters within the document, the weight being based on term frequency by inverse document frequency; and generating a core tensor by reducing dimensionality of the generated high-order tensor using high-order singular value decomposition;

training a support vector machine ("SVM") classifier using the generated core tensors for the documents and the categories of the documents; and categorizing a document by generating a high-order tensor for the document, generating a core tensor for the generated high-order tensor for the document, and applying the SVM classifier to the generated core tensor for the document to determine a category for the document.

2. The computer-readable medium of claim 1 wherein the documents are derived from new groups.

3. The computer-readable medium of claim 1 wherein the generating of a core tensor for a document includes unfolding the generated high-order tensor for the document, applying a singular value decomposition to the unfolded tensor to generate a unfolded core tensor, and folding the unfolded core tensor.

4. A method performed by a computer system to categorize a document, the method performed by a processor of the computer system comprising:

for each of a plurality of categories, storing documents within that category, each document having words with characters;

for each document, generating a high-order tensor having an order of at least three, each order represented by a coordinate with characters as dimensions of the coordinate, each element of the high-order tensor representing a sequence of at least three characters and being set to a weight based on number of occurrences of that sequence of at least three characters within the document; and generating a core tensor by reducing dimensionality of the generated high-order tensor;

training a classifier using the generated core tensors for the documents and the categories of the documents; and categorizing a document by generating a high-order tensor for the document, generating a core tensor for the generated high-order tensor for the document, and applying the classifier to the generated core tensor for the document to determine a category for the document.

5. The method of claim 4 wherein the training includes for each category, generating an average of the core tensors of documents within that category.

6. The method of claim 5 wherein the applying of the classifier to the generated core tensor for the document includes selecting as the category for the document the category whose average core tensor is most similar to the generated core tensor for the document.

7. The method of claim 4 wherein the classifier is a support vector machine ("SVM") classifier.

8. The method of claim 4 wherein the weight is based on a term frequency by inverse document frequency metric.

9. The method of claim 4 wherein the generating a core tensor for a document includes unfolding the generated high-order tensor for the document, applying a singular value decomposition to the unfolded tensor to generate a unfolded core tensor, and folding the unfolded core tensor.

10. A computer system that categorizes a document, comprising:
a processor; and
a memory storing:
- a corpus of documents, each document having words and a category;
- a tensor space model module that generates a high-order tensor having an order of at least three, each order represented by a coordinate with characters as dimensions of the coordinate, each element of the high-order tensor representing a sequence of at least three characters and being set to a weight based on number of occurrences of that sequence of at least three characters within the document;
- an analyzing module that generates a core tensor by reducing dimensionality of the generated high-order tensor;
- a training module that trains a classifier using the generated core tensors for the documents and the categories of the documents; and
- a categorization module that categorizes a document by generating a high-order tensor for the document, generates a core tensor for the generated high-order tensor for the document, and applies the classifier to the generated core tensor for the document to determine a category for the document.

11. The computer system of claim 10 wherein the training module, for each category, generates an average of the core tensors of documents within that category.

12. The computer system of claim 11 wherein the categorization module includes selecting as the category for the document the category whose average core tensor is most similar to the generated core tensor for the document.

13. The computer system of claim 12 wherein the weight is based on a term frequency by inverse document frequency metric.

14. The computer system of claim 13 wherein the analyzing module generates a core tensor for a document by unfolding the generated high-order tensor for the document, applying a singular value decomposition to the unfolded tensor to generate a unfolded core tensor, and folding the unfolded core tensor.

15. The computer system of claim 10 wherein the classifier is a support vector machine ("SVM") classifier.

* * * * *